United States Patent
Fusayasu et al.

(10) Patent No.: US 10,122,885 B2
(45) Date of Patent: Nov. 6, 2018

(54) IMAGE READING DEVICE

(71) Applicant: Panasonic Intellectual Property Management Co., Ltd., Osaka (JP)

(72) Inventors: Hirotsugu Fusayasu, Kyoto (JP); Ryo Matsubara, Osaka (JP); Katsuo Inokuchi, Fukuoka (JP); Tatsuya Hirota, Fukuoka (JP); Yuuichi Tutiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/674,793

(22) Filed: Aug. 11, 2017

(65) Prior Publication Data

US 2017/0353618 A1  Dec. 7, 2017

Related U.S. Application Data

(63) Continuation of application No. PCT/JP2016/000331, filed on Jan. 25, 2016.

(30) Foreign Application Priority Data

Mar. 19, 2015 (JP) ................................. 2015-056186

(51) Int. Cl.
*H04N 1/04* (2006.01)
*H04N 1/028* (2006.01)
(Continued)

(52) U.S. Cl.
CPC ........... *H04N 1/02815* (2013.01); *G06T 1/00* (2013.01); *H04N 1/125* (2013.01); *H04N 1/19* (2013.01);
(Continued)

(58) Field of Classification Search
CPC .... H04N 1/02815; H04N 1/125; H04N 1/401; H04N 2201/0081
(Continued)

(56) References Cited

U.S. PATENT DOCUMENTS 4,974,072 A  11/1990 Hasegawa
7,391,533 B2  6/2008 Hiromatsu
(Continued)

FOREIGN PATENT DOCUMENTS

JP  1-101061  4/1989
JP  2-254867  10/1990
(Continued)

OTHER PUBLICATIONS

International Search Report dated Mar. 8, 2016 in International (PCT) Application No. PCT/JP2016/000331.

*Primary Examiner* — Houshang Safaipour
(74) *Attorney, Agent, or Firm* — Wenderoth, Lind & Ponack, L.L.P.

(57) ABSTRACT

An image reading device includes: an FB glass; a sensor module having a light source and a plurality of sensors; and an image processor that generates correction data to be used for shading correction and performs the shading correction on image signals by using the correction data. The plurality of sensors is arranged in a main scanning direction and is configured to form an image signal on a single line. The image processor acquires second black data by causing the plurality of sensors to acquire an image signal of a reference sheet placed on the FB glass with the light source turned on, and generates black correction data based on the second black data. By performing the shading correction by using the black correction data, the image processor corrects density unevenness, in an image, caused by interference between image signals from the plurality of sensors.

2 Claims, 11 Drawing Sheets

(51) Int. Cl.
  *G06T 1/00* (2006.01)
  *H04N 1/19* (2006.01)
  *H04N 1/401* (2006.01)
  *H04N 1/12* (2006.01)
  *H04N 1/407* (2006.01)

(52) U.S. Cl.
  CPC ........... *H04N 1/401* (2013.01); *H04N 1/4076* (2013.01); *H04N 2201/0081* (2013.01); *H04N 2201/0094* (2013.01)

(58) Field of Classification Search
  USPC .......................................... 358/474, 475, 483
  See application file for complete search history.

(56) References Cited

U.S. PATENT DOCUMENTS

| | | |
|---|---|---|
| 7,961,361 B2 | 6/2011 | Kawai |
| 2008/0055668 A1 | 3/2008 | Hirayama |
| 2008/0204820 A1 | 8/2008 | Ito |
| 2009/0086279 A1* | 4/2009 | Kawai ................. H04N 1/4076 358/461 |
| 2012/0069227 A1* | 3/2012 | Hasuo ................... H04N 5/217 348/243 |
| 2014/0293371 A1* | 10/2014 | Kurokawa ............. H04N 1/042 358/475 |

FOREIGN PATENT DOCUMENTS

| | | | |
|---|---|---|---|
| JP | 1990-254867 | * 10/1990 | ............... H04N 1/46 |
| JP | 2002-101278 | 4/2002 | |
| JP | 2003-198813 | 7/2003 | |
| JP | 2007-49241 | 2/2007 | |
| JP | 2008-60975 | 3/2008 | |
| JP | 2012-70089 | 4/2012 | |
| JP | 5007133 | 6/2012 | |

* cited by examiner

IMAGE READING DEVICE

BACKGROUND

1. Technical Field

The present disclosure relates to an image reading device that reads an image of an object.

2. Description of the Related Art

Unexamined Japanese Patent Publication No. 2008-060975 discloses an image reading device including a white reference plate. The image reading device acquires white reference data from an output of a sensor when an image of the white reference plate with a light source turned on is acquired. In addition, the image reading device acquires black reference data from an output of the sensor with the light source turned off. The image reading device performs shading correction based on the thus acquired white reference data and black reference data.

SUMMARY

An image reading device of the present disclosure includes: a glass plate on which an object is placed; a sensor module including a light source that illuminates the object on the glass plate, and a plurality of sensors that reads light reflected from the object to acquire image signals; a data generator that generates correction data to be used for shading correction; and a corrector that performs, by using the correction data, the shading correction on the image signals acquired by the plurality of sensors. The plurality of sensors is arranged in a predetermined main scanning direction and is configured such that the image signals of the plurality of sensors constitute a single line, extending in the main scanning direction, of the image signals. The data generator acquires second black data by causing the plurality of sensors to acquire an image signal of a black reference member placed on the glass plate and illuminated by the light source, and generates black correction data as a black reference for the shading correction based on the second black data. The corrector corrects, by performing the shading correction by using the black correction data, density unevenness, in an image, caused by interference between image signals from the plurality of sensors.

Note that the expression "placed on the glass plate" means to include a case where the black reference member passes on the glass plate, in other words, a case that the black reference member is instantaneously placed on the glass plate.

This configuration can reduce unevenness in image density caused by the interference between outputs from the plurality of sensors.

DETAILED DESCRIPTION

In the following, exemplary embodiments will be described in detail with reference to the drawings appropriately. However, an unnecessarily detailed description will not be given in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the inventors of the present disclosure provide the accompanying drawings and the following description to help those skilled in the art to sufficiently understand the present disclosure, but do not intend to use the drawings or the description to limit the subject matters of the claims.

BACKGROUND OF THE DISCLOSURE

In an image reading device such as a scanner that reads a document and then forms image data, there is a distortion generated depending on the position of pixels, due to unevenness in light receiving elements of a sensor module such as a charge-coupled device (CCD) and a contact image sensor (CIS), due to the difference of light converging performance between a central part and a peripheral part of a lens, and due to unevenness in a light amount distribution of a light source.

To address this problem, there is known an image reading device in which shading correction is performed on acquired image data. Further, there is known an image forming apparatus such as a multifunction peripheral and a copy machine including such an image reading device.

With the configuration in which a plurality of sensors is arranged in a main scanning direction and image signals of the plurality of sensors constitute a single line, extending in the main scanning direction, of the image signals, density unevenness may be caused in an image due to the interference between outputs from the plurality of sensors. Such density unevenness, however, cannot be sufficiently corrected only by shading correction.

In view of the above, in order to solve the problem as described above, the present disclosure provides an image reading device in which the density unevenness in the image due to the interference between the outputs from the plurality of sensors is reduced.

First Exemplary Embodiment

Hereinafter, exemplary embodiments will be described in detail with reference to the drawings.

1. Configuration

[1-1. Multifunction Peripheral]

Figure 1:
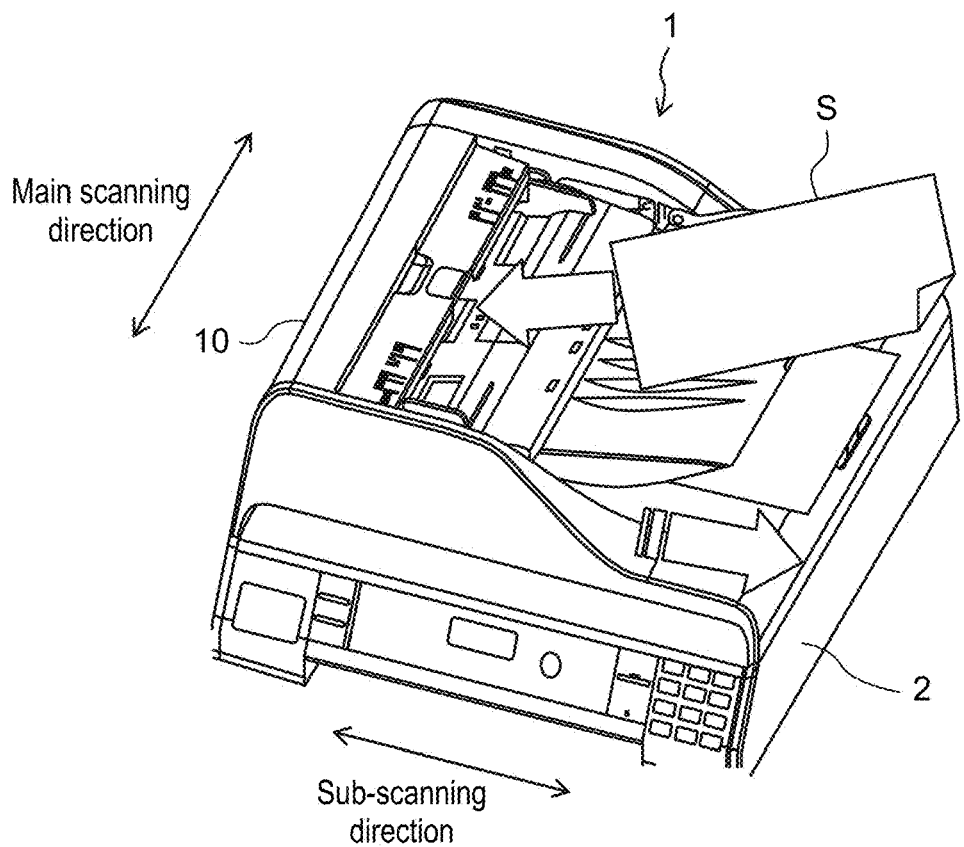
FIG. 1 is a perspective view of a multifunction peripheral in a first exemplary embodiment.
Figure 2:
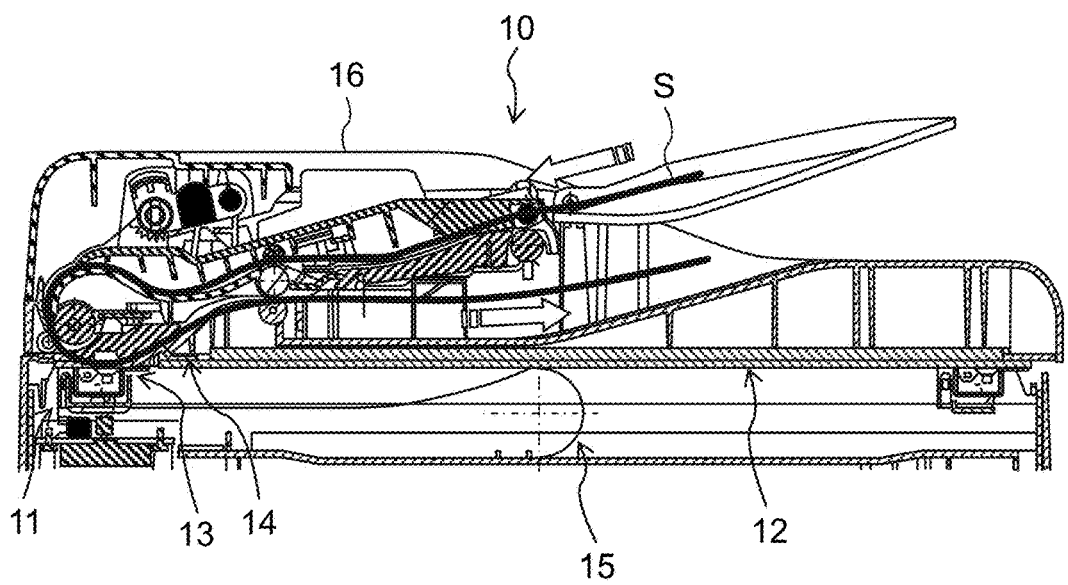
FIG. 2 is a sectional view of the multifunction peripheral in the first exemplary embodiment.

A description will be given, with reference to FIGS. 1 and 2, of a hardware configuration of a multifunction peripheral 1 including image reading device 10 in a first exemplary embodiment. FIG. 1 is a perspective view of multifunction peripheral 1 in the first exemplary embodiment. FIG. 2 is a sectional view of multifunction peripheral 1 in the first exemplary embodiment.

Multifunction peripheral 1 includes main unit 2 and image reading device 10 mounted on an upper part of main unit 2. Multifunction peripheral 1 has a scan function performed by image reading device 10, and in addition, other functions (for example, a print function, a copy function, a facsimile transmission/reception function, and the like). Main unit 2 has a configuration depending on the functions of multifunction peripheral 1.

Image reading device 10 is a flat bed (FB) type image scanner as shown in FIG. 1 and FIG. 2. Image reading device 10 has scanner unit 11, FB glass 12, ADF glass 13, white reference plate 14, auto document feeder (ADF) 16, and controller 100 (see FIG. 4).

FB glass 12 and ADF glass 13 are disposed on an upper surface of main unit 2. FB glass 12 occupies the most part of the upper surface of main unit 2. On FB glass 12, document S is to be placed as a reading object. ADF glass 13 reads document S fed by ADF 16. FB glass 12 and ADF glass 13 are examples of the glass plate.

ADF 16 is disposed on main unit 2 such that ADF 16 covers FB glass 12 and ADF glass 13. ADF 16 feeds document S automatically.

Scanner unit 11 acquires the image of the reading object. Scanner unit 11 moves in main unit 2 along bottom surfaces of FB glass 12 and ADF glass 13. The direction in which scanner unit 11 moves is referred to as a sub-scanning direction. FB glass 12 and ADF glass 13 are arranged in the sub-scanning direction.

Scanner unit 11 is driven by a motor (not shown), and moves in the sub-scanning direction along a guide member (not shown). The motor is controlled by controller 100. Scanner unit 11 is connected to controller 100 through flexible flat cable (FFC) 15. Further, scanner unit 11 has sensor module 102.

White reference plate 14 is disposed on the upper part of main unit 2 and between FB glass 12 and ADF glass 13. White reference plate 14 is disposed to face inside of main unit 2, in other words, to face scanner unit 11.

FFC 15 is a communication cable having signal lines therein. FFC 15 is long enough and flexible enough for scanner unit 11 to move smoothly within the movable range.

Figure 3:
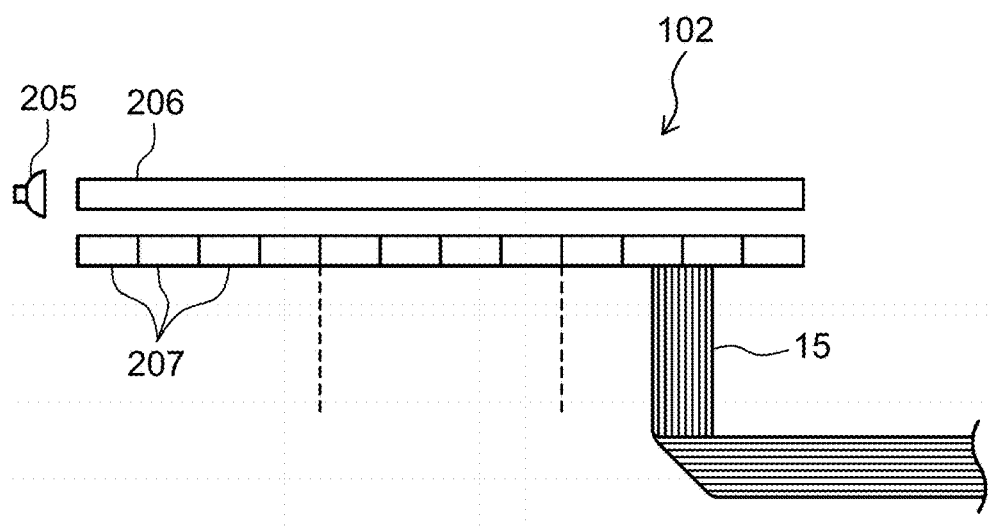
FIG. 3 is a schematic diagram of a sensor module in the first exemplary embodiment.

FIG. 3 is a schematic diagram of sensor module 102 in the first exemplary embodiment. Sensor module 102 is of the contact image sensor type in the present exemplary embodiment, that is, the CIS type. Sensor module 102 has light source 205 and a plurality of sensors 207.

The plurality of sensors 207 is arranged in the main scanning direction perpendicular to the sub-scanning direction. Typically, sensors 207 are made up of sensor ICs and are, for example, CMOS image sensors. One of sensors 207 includes a plurality of pixels (photoelectric convertors) arranged in the main scanning direction. A rod lens array (not shown) is provided above sensors 207. Light converged by the rod lens array enters sensors 207.

The plurality of sensors 207 is divided into a plurality of sectors. The received light is converted into image signals, and the converted image signals are output from each of the sectors. That is, the sector is a group of sensors 207 that output the image signals in a group. For example, in a case where the number of sensors 207 is 12 and sensors 207 are divided into three sectors, each sector includes four sensors 207. Sensors 207 output the image signals to controller 100 through FFC 15.

Light source 205 is typically an LED. For example, light source 205 is made up of three LEDs of red (R), green (G), and blue (B). Light source 205 is disposed on one end (the left end of FIG. 3) of sensor module 102, in the main scanning direction. Sensor module 102 has light guide 206. The light from light source 205 is emitted upward through light guide 206, i.e., toward FB glass 12, ADF glass 13, or white reference plate 14. Since light source 205 and light guide 206 are disposed in the vicinity of sensors 207, the light reflected by the document on FB glass 12 or ADF glass 13 or reflected by white reference plate 14 enters sensors 207 through the rod lens array.

White reference plate 14 extends in the main scanning direction. White reference plate 14 has a length, in the main scanning direction, longer than at least sensor module 102 (more specifically, the row of the plurality of sensors 207). White reference plate 14 has, at least on the surface opposed to sensor module 102, a white area that extends over the whole length of sensor module 102 in the main scanning direction. Further, white reference plate 14 is provided with a reference pattern provided at a position shifted, from the white area, in the sub-scanning direction. The reference pattern indicates a home position. As the reference pattern, any pattern can be employed as long as image processor 204 can identify the pattern. For example, the reference pattern may be a plurality of black lines that is arranged in the main scanning direction and extends in the sub-scanning direction.

[1-2. Image Reading Device]

Figure 4:
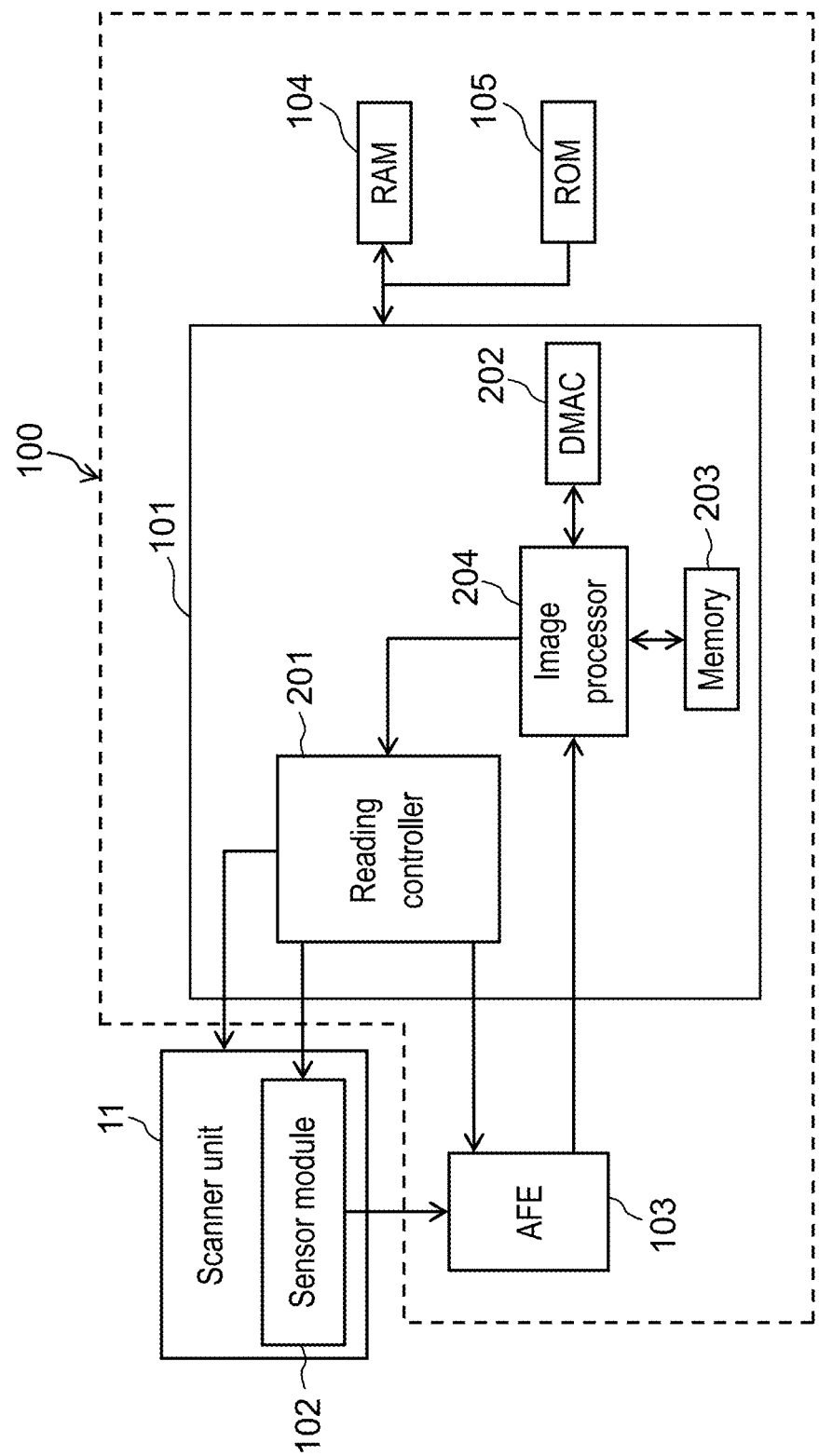
FIG. 4 is a block diagram of an image reading device in the first exemplary embodiment.

FIG. 4 is a block diagram of image reading device 10 in the first exemplary embodiment.

As shown in FIG. 4, image reading device 10 includes scanner unit 11 and controller 100.

Controller 100 controls an image reading operation of scanner unit 11 and performs image processing on the image signal being output from scanner unit 11. Controller 100 has CPU 101, analog front end circuit (AFE) 103, random access memory (RAM) 104, and read only memory (ROM) 105.

The image signal (analog signal) is input to AFE 103 from sensor module 102 of scanner unit 11. AFE 103 has an analog-to-digital converter, an amplifier, and the like. AFE 103 amplifies, by the amplifier, the image signal from sensor module 102, adds or subtracts an offset to or from the amplified image signal, converts the signal by the analog-to-digital converter into a digital signal (image data), and outputs the digital signal to CPU 101.

RAM 104 stores the image data acquired by CPU 101. ROM 105 stores a predetermined program necessary to the image processing on CPU 101.

CPU 101 has reading controller 201, direct memory access controller (DMAC) 202, memory 203, and image processor 204.

Reading controller 201 controls operations of scanner unit 11 (including sensor module 102), ADF 16, and AFE 103.

For example, reading controller 201 controls driving of the motor (not shown) for conveying document S set on ADF 16.

Image processor 204 performs the image processing on the image signal being input from AFE 103. Image processor 204 performs the image processing by reading out the program stored in ROM 105 and by executing the read-out program. Although a detailed description will be given later, image processor 204 performs various image processing such as a filtering process and a shading correction process. Image processor 204 is an example of the data generator and an example of the corrector.

DMAC 202 performs a data transfer process that transfers the image signal acquired by the image processing performed by image processor 204.

Memory 203 stores various data. For example, memory 203 stores the data to be used for the shading correction.

2. Operations

[2-1. Image Reading Operation]

Figure 5:
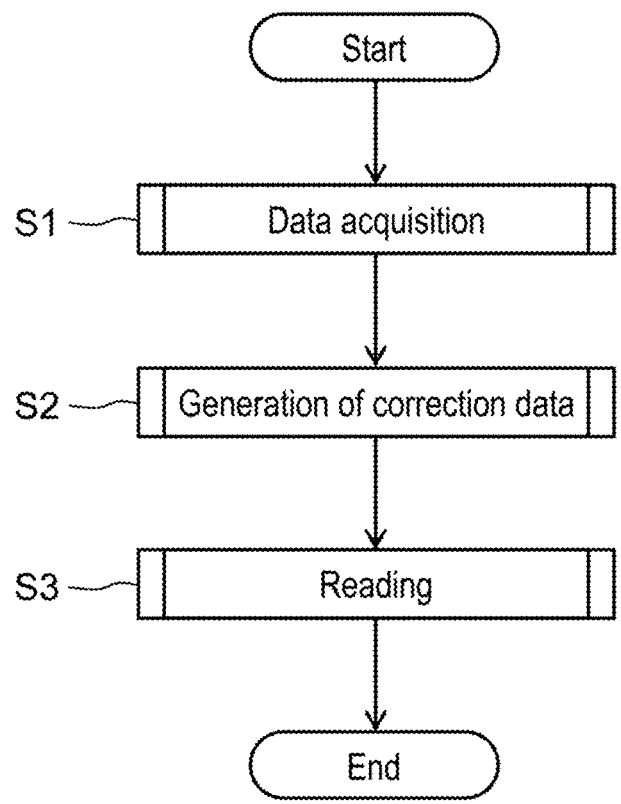
FIG. 5 is a flowchart of an image reading operation of the image reading device in the first exemplary embodiment.

The operation of image reading device 10 will be described. FIG. 5 is a flowchart of the image reading operation of image reading device 10 in the first exemplary embodiment.

The image reading operation starts when a power source of image reading device 10 is turned on and an operation of a user is then received. First, in step S1, image processor 204 acquires the data for generating correction data to be used for the shading correction. Next, in step S2, image processor 204 generates the correction data based on the data acquired in step S1. Then, in step S3, image processor 204 reads the document. At this time, image processor 204 performs the shading correction on the read-out image signal by using the correction data.

[2-2. Data Acquisition Process]

Figure 6:
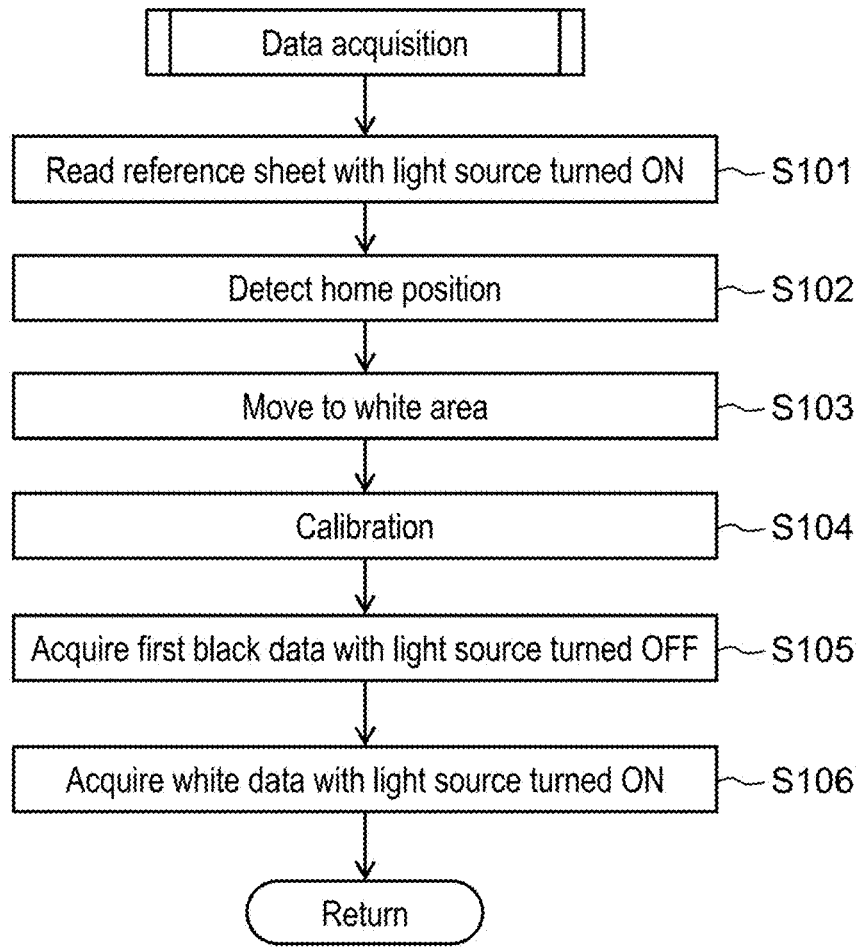
FIG. 6 is a flowchart of a data acquisition process of the image reading device in the first exemplary embodiment.

FIG. 6 is a flowchart of a data acquisition process of image reading device 10 in the first exemplary embodiment.

The user places black reference sheet 3 on FB glass 12 and then performs an operation for data acquisition through an operation unit (not shown) of image reading device 10, so that the process of data acquisition is started. Reference sheet 3 is used for acquiring data necessary to generate the correction data and is equipped with image reading device 10.

Figure 7:
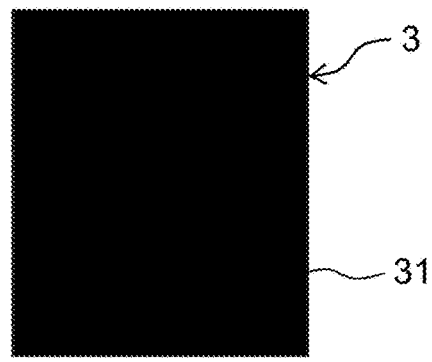
FIG. 7 is a schematic diagram of a reference sheet.

FIG. 7 is a schematic diagram of the reference sheet.

Reference sheet 3 has black area 31 as shown in FIG. 7. Black area 31 has a length, in the main scanning direction, longer than at least sensor module 102 (more specifically, the row of the plurality of sensors 207). Reference sheet 3 of the present disclosure has black area 31 over the entire surface on one side. However, the length of black area 31 in the sub-scanning direction only needs to be longer than the length of the row of sensors 207 in the sub-scanning direction. The user sets reference sheet 3 at a predetermined position on FB glass 12. Reference sheet 3 is an example of the black reference member.

Note that the material for reference sheet 3 may be paper or other materials. Further, reference sheet 3 may be a sheet on which black area 31 is printed by image reading device 10.

In step S101, image processor 204 causes, through reading controller 201, sensor module 102 to move to a position facing black area 31 of reference sheet 3. Image processor 204 causes light source 205 to illuminate black area 31 and acquires the image of black area 31. That is, image processor 204 receives the light reflected by black area 31 and converts the received light into an image signal. Because the image data at this time are not the image data generated by reading a black object, the image data do not represent the output level, of sensor 207, of black at the darkest density level. The image data represent the output level, of sensor 207, of a color close to black at a relatively dark density level. Image processor 204 stores the image data in memory 203 as the second black data.

Subsequently, in step S102, image processor 204 detects the home position of sensor module 102. Specifically, image processor 204 causes, through reading controller 201, sensor module 102 to move to the home position stored in memory 203. This position is a temporary home position. Then, image processor 204 causes sensor module 102 to acquire an image at this position, and determines whether or not the reference pattern is detected from the acquired image. If the reference pattern is detected, image processor 204 determines that the current position of sensor module 102 is precisely at the home position. If the reference pattern is not detected, image processor 204 causes sensor module 102 to move toward one side in the sub-scanning direction to search for the reference pattern. If the reference pattern is detected, image processor 204 finishes detecting the home position. However, if the reference pattern is not detected even when sensor module 102 is moved toward the one side of the sub-scanning direction from the temporary home position by a certain distance, image processor 204 returns sensor module 102 back to the temporary home position and causes sensor module 102 to move toward the other side in the sub-scanning direction to search for the reference pattern. Image processor 204 continues to make sensor module 102 move toward the other side in the sub-scanning direction until the reference pattern is detected. Image processor 204 stores the detected position of the home position in memory 203, and at the next detection of the home position, image processor 204 uses the home position, which is stored in memory 203, as the temporary home position.

Next, in step S103, image processor 204 causes, through reading controller 201, sensor module 102 to move to the position facing the white area of white reference plate 14. Because the distance, in the sub-scanning direction, between the reference pattern and the white area is known, image processor 204 can cause sensor module 102 to move accurately to the position facing the white area based on the home position detected in step S102.

When sensor module 102 has moved to the position facing the white area, image processor 204 performs calibration in step S104. For example, image processor 204 performs initial setting such as the setting of a lighting time of light source 205 and the setting of AFE 103. By setting the lighting time of light source 205, it is possible to equalize output levels of the image signals being output from the plurality of sensors 207.

When the calibration is completed, then in step S105, image processor 204 acquires the image with light source 205 turned off (the light source being OFF). In this case, because light source 205 is off, at least the light from light source 205 (that is, the light emitted from light source 205 and reflected by the object) does not enter sensors 207. Therefore, the image data at this time represent the output level of sensor 207 of black that is at the darkest density level. Image processor 204 stores the image data in memory 203 as first black data.

Subsequently, in step S106, image processor 204 acquires white data. Specifically, image processor 204 acquires the image of the white area of white reference plate 14 while light source 205 is turned on (the light source is ON).

Because the reflectance of the white area is substantially 100%, the image data at this time, i.e., the white data represent the output level of sensor 207 of white at the lightest density level. Image processor 204 stores the white data in memory 203 as white correction data.

[2-3. Correction Data Generation Process]

Image processor 204 generates black correction data as a black reference for the shading correction, from the first black data and the second black data acquired by the data acquisition process.

A noise may be generated on the image signals when the image signals from the plurality of sensors 207 interfere with each other on transmission lines of the image signals (crosstalk). In particular, in the configuration in which the image signals are output through FFC 15 as in the case of sensors 207, crosstalk is likely to be generated due to bending of FFC 15.

Figure 8:
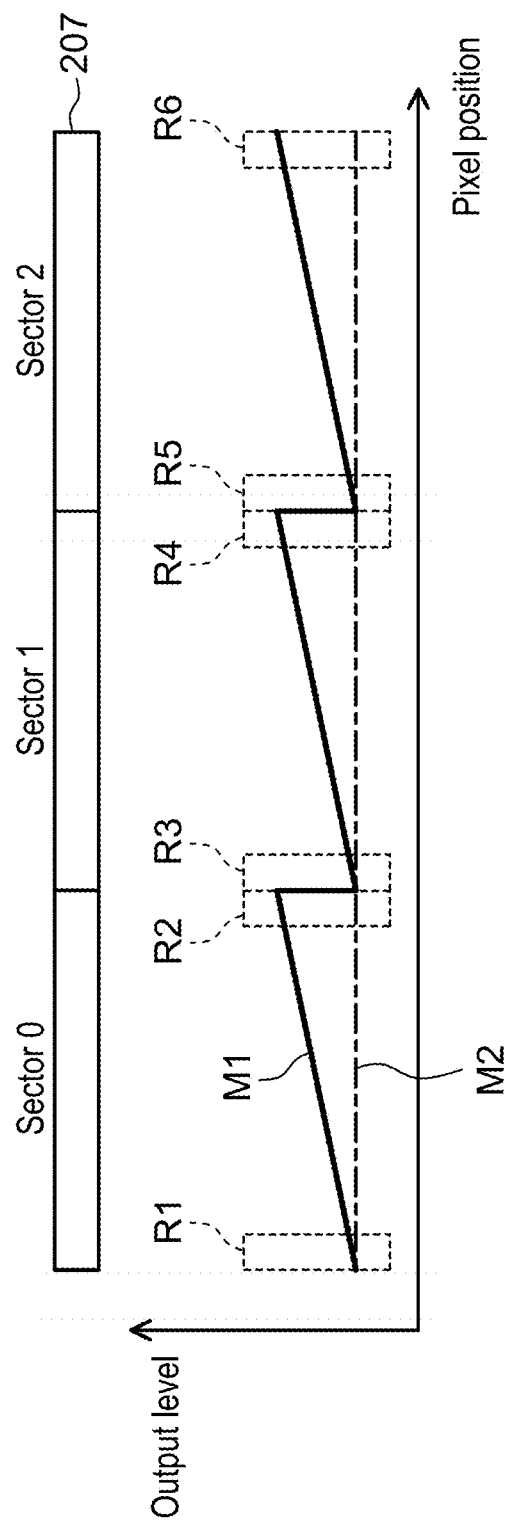
FIG. 8 is a diagram showing an example of an output level of a sensor.

FIG. 8 is a diagram showing an example of the output level of sensors 207. In FIG. 8, one-dot chain line M2 represents the case where there is no crosstalk, and solid line M1 represents the case where there is crosstalk. The vertical axis of FIG. 8 represents the output level of sensors 207, and the horizontal axis represents the position, of the pixels of the sensors 207, in the main scanning direction. For example, in a case where an object with uniform reflectance is imaged, the output levels of the pixels are substantially constant as represented by one-dot chain line M2 in FIG. 8 if the pixels are assumed to have no individual differences between pixels when there is no crosstalk. However, when crosstalk is generated, the output levels of the pixels change in each sector as represented by solid line M1 in FIG. 8. For example, as shown in FIG. 8, the output levels of the pixels in each sector increase linearly from one end toward the other end of the sector. Further, when there is difference between the output levels of the pixels in each sector, there is generated a step between the output levels at the part at which the sectors change.

Figure 9C:
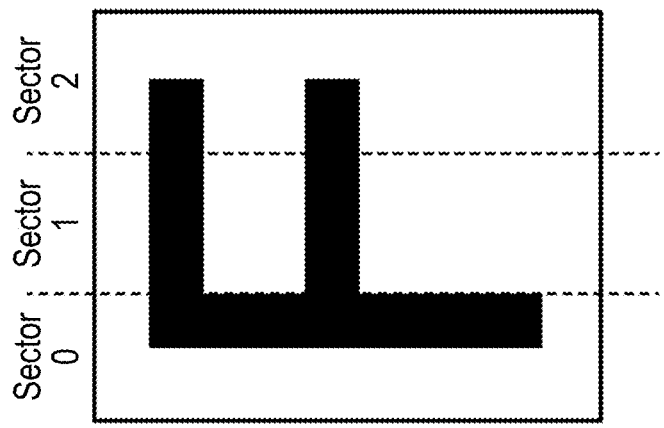
FIG. 9C is a diagram showing a read image on which shading correction has been performed.
Figure 9B:
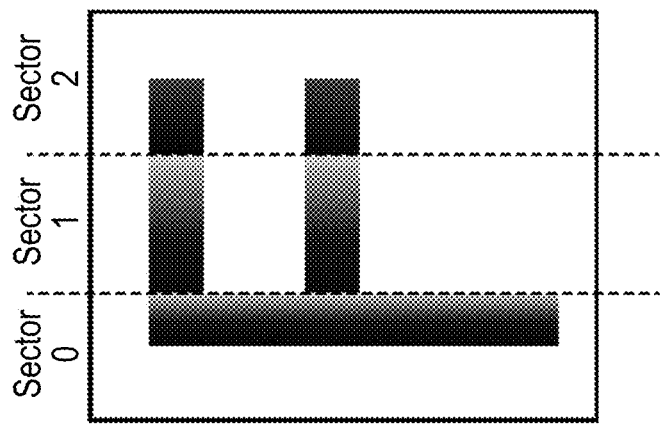
FIG. 9B is a diagram showing a read image on which conventional shading correction has been performed.
Figure 9A:
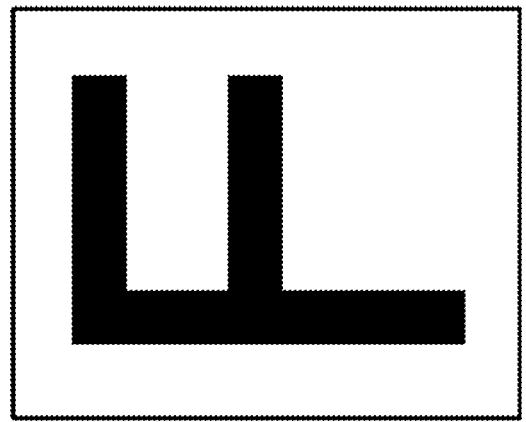
FIG. 9A is a diagram showing an image of a document.

FIG. 9A is a diagram showing an image of a document. FIG. 9B is a diagram showing a read image on which conventional shading correction has been performed. FIG. 9C is a diagram showing a read image on which shading correction in the first exemplary embodiment has been performed.

FIG. 9A shows an example of the image of document S. FIG. 9B shows a read image which is a read image of document S and on which conventional shading correction has been performed. As shown in FIG. 9B, when a noise is generated due to crosstalk, density unevenness is generated in the read image. In the read image of FIG. 9B, density unevenness is generated at the part corresponding to the boundary between the sectors of sensors 207.

Figure 10:
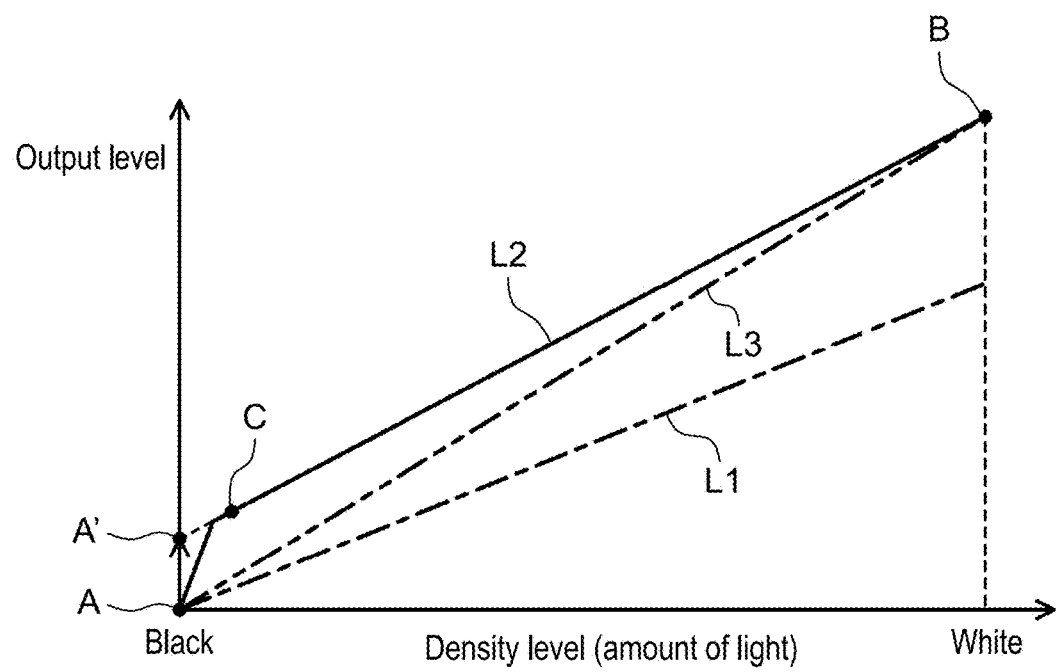
FIG. 10 is a graph showing a relationship of an output level with respect to a density level of a sensor.

Further, FIG. 10 is a graph showing the relationship of the output level of sensor 207 with respect the density level (amount of light). Each pixel of sensor 207 outputs a voltage signal corresponding to an amount of light. Change in the voltage corresponding to an amount of light depends on characteristics of sensor 207. For example, in a case where the voltage changes linearly depending on an amount of light, the voltage ideally changes as shown by one-dot chain line L1. However, if the noise caused by crosstalk (hereinafter, referred to as an "interference noise") is superposed on the output signal, the voltage changes as shown by solid line L2. That is, because the output level of black at the darkest density level is low, an interference noise hardly appears on the output signal. However, when the density level becomes a bit lighter than the black, the output level of sensor 207 increases, and the interference noise increases accordingly.

In the case of conventional typical shading correction, image data are acquired with light source 205 turned off (point A), and the image data are used as the black correction data to be the black reference. The image data of white are acquired when light source 205 is on (point B), and the image data are used as the white correction data to be the white reference. By performing shading correction using the thus acquired black correction data and white correction data, an offset and a gain (dynamic range) of each pixel is corrected. However, an interference noise is not likely to affect the image signal acquired while light source 205 is off. For this reason, if the shading correction is performed by using the image data at point A and point B, the shading correction is performed based on the characteristics shown by two-dot chain line L3 different from the actual output characteristics of sensor 207, and thus, the shading correction cannot be appropriately performed.

To address this problem, in image reading device 10 of the present disclosure, the black correction data are generated by using the first black data and the second black data. The first black data are acquired while light source 205 is off, and the second black data are acquired while light source 205 is on.

Figure 11:
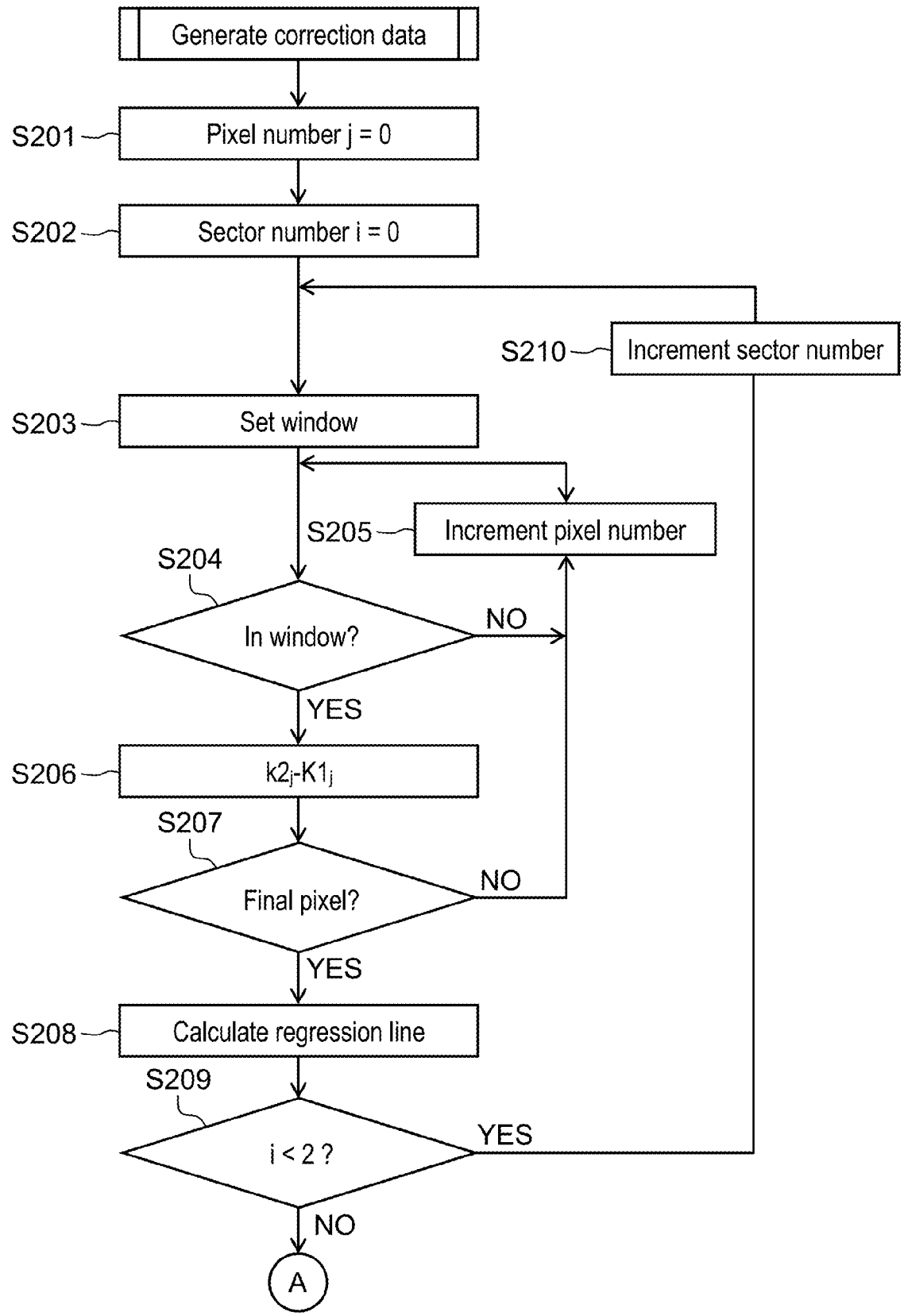
FIG. 11 is a flowchart of a front stage of a correction data generation process of the image reading device in the first exemplary embodiment.
Figure 12:
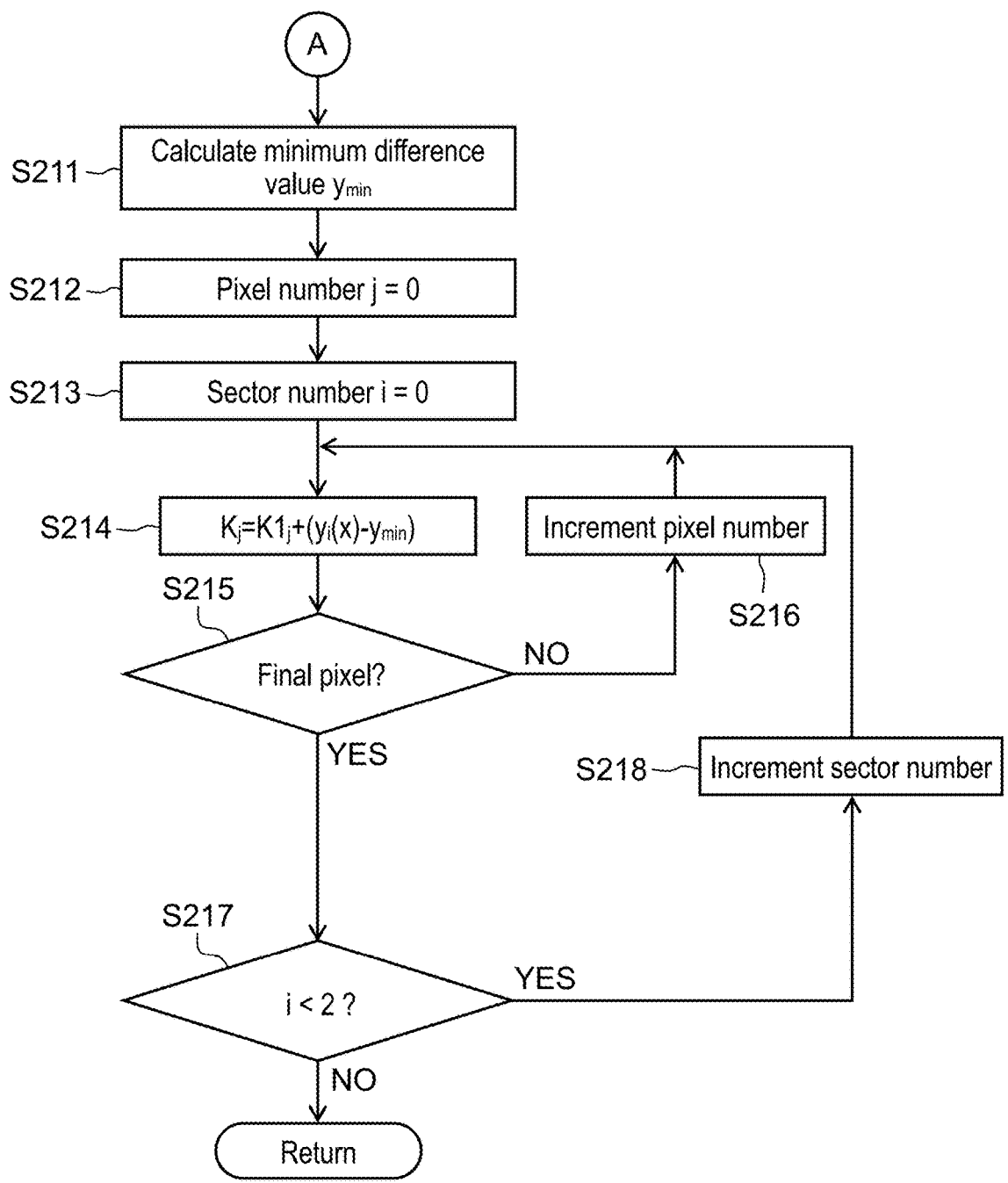
FIG. 12 is a flowchart of a rear stage of the correction data generation process of the image reading device in the first exemplary embodiment.
Figure 13:
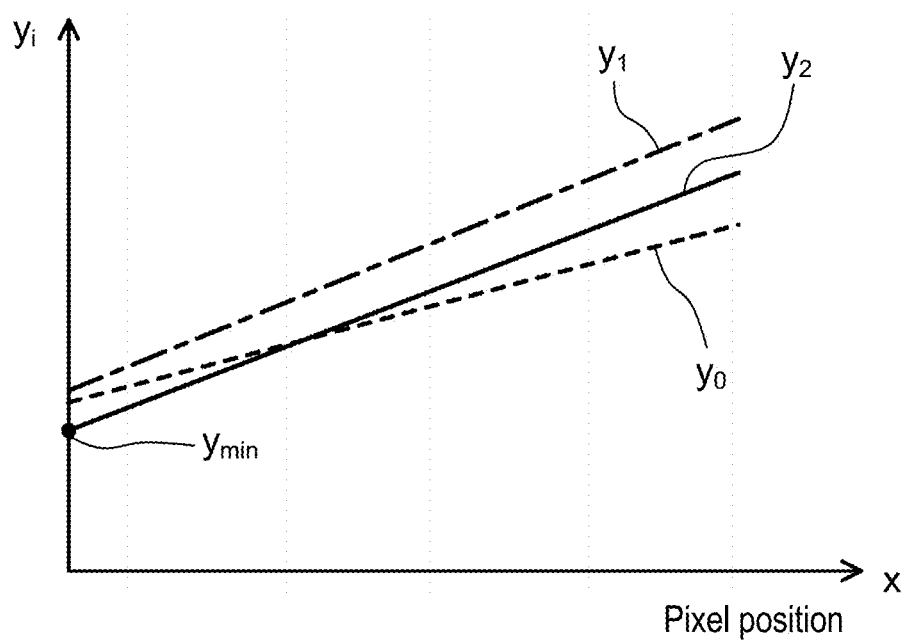
FIG. 13 is a diagram showing a regression line of a difference value in each sector.

FIG. 11 is a flowchart of the front stage of a correction data generation process of image reading device 10 in the first exemplary embodiment. FIG. 12 is a flowchart of the rear stage of the correction data generation process of image reading device 10 in the first exemplary embodiment. FIG. 13 is a diagram showing a regression line of a difference value in each sector.

In the following description, the number of sectors and the number of pixels for sensor 207 are respectively three and n. Further, the sector is represented by $S_i$ (i=0 to 2), and the pixel is represented by $X_j$ (j=0 to n−1). Sector $S_0$ is located on one end, of sensor 207, in the main scanning direction, sector $S_1$ is next to sector $S_0$, and sector $S_2$ is next to sector $S_1$ and is located on the other end, of sensor 207, in the main scanning direction. As for the pixels, pixel $X_0$ is on one end, of sensor 207, in the main scanning direction, and the pixel having a larger pixel number j is closer to the other end in the main scanning direction, where pixel $X_{n-1}$ is on the other end, of sensor 207, in the main scanning direction.

In step S201, image processor 204 sets the pixel number j to 0. Further, in step S202, image processor 204 sets sector number i to 0.

Next, in step S203, image processor 204 sets an area (window) in which difference values to be described later are calculated in each sector. In detail, as shown in FIG. 8, windows are set at one end and at the other end, in each sector, in the main scanning direction. A width of each window is set to include a predetermined number of pixels. In FIG. 8, in sector $S_0$, start window R1 and end window R2 are respectively set at one end and the other end in the main scanning direction. Similarly, in sector $S_1$, start window R3 and end window R4 are respectively set at one end and the other end in the main scanning direction. Further, in sector $S_2$, start window R5 and end window R6 are respectively set at one end and the other end in the main scanning direction.

In step S204, image processor 204 determines whether or not pixel $X_j$ is included in the window. For example, because the equation is j=0 just after step S201, pixel $X_j$ is included in start window R1 of sector $S_0$.

If the pixel $X_j$ is outside the window, image processor 204 increments the pixel number j in step S205 and performs the process of step S204 again. That is, image processor 204 determines whether or not the next pixel $X_j$ is included in the window.

On the other hand, if pixel $X_j$ is in the window, image processor 204 calculates, in step S206, a difference value $(K2_j-K1_j)$ between an output level $K2_j$ of pixel $X_j$ of the second black data and an output level $K1_j$ of pixel $X_j$ of the first black data, and stores the calculated difference value in memory 203.

After that, in step S207, image processor 204 determines whether or not pixel $X_j$ is the final pixel in sector $S_i$. If pixel $X_j$ is not the final pixel, image processor 204 increments, in step S205, the pixel number j, and performs the process of step S204 again.

On the other hand, if pixel $X_j$ is the final pixel, image processor 204 calculates, in step S208, a regression line of the difference values in sector $S_i$. Specifically, as shown in FIG. 13, image processor 204 calculates a regression line $y_i(x)=a_i \times x+b_i$ of the difference value of the pixel included in the start window in sector $S_i$ and the difference value of the pixel included in the end window, where x is the pixel position in the sector, $y_i$ is the difference value, i is a sector number, $a_i$ is the coefficient (inclination) of the regression line, $b_i$ is the coefficient (constant term) of the regression line. Image processor 204 stores the calculated coefficients $a_i$ and $b_i$ of the regression line in memory 203. In FIG. 13, dotted line y0 represents the regression line in sector $S_0$, solid line y2 represents the regression line in sector $S_1$, and one-dot chain line y1 represents the regression line in sector $S_2$.

Next, in step S209, image processor 204 determines whether or not the sector number i is smaller than 2. If the sector number i is smaller than 2, image processor 204 increments, in step S210, the sector number i, and performs the process of step S203 again. That is, unless sector $S_i$ in which the regression line has been calculated is the final sector (that is, sector $S_2$), image processor 204 changes sector $S_i$ to the next sector $S_{i+1}$ and repeats the calculation of the regression line.

On the other hand, if the sector number i is not less than 2, practically, if the sector number is 2, image processor 204 finishes the front stage of generating the correction data.

Subsequently, image processor 204 performs the process of the rear stage of generating the correction data. In detail, as shown in FIG. 13, image processor 204 obtains, in step S211, the minimum difference value $y_{min}$ ($y_{min}=\min(y_i)$) in the three regression lines y0 to y2, stored in memory 203, of sector $S_0$, sector $S_1$, and sector $S_2$. That is, the minimum difference value $y_{min}$ is the smallest minimum value, of the minimum values in the regression line of each sector, in the three sectors.

Next, image processor 204 sets, in step S212, the pixel number j to 0. Subsequently, image processor 204 sets, in step S213, the sector number i to 0.

Then, image processor 204 corrects, in step S214, the output level $K1_j$ of pixel $X_j$ of the first black data by using the minimum difference value $y_{min}$, and thus obtains the black correction data. Specifically, the correction value $K_j$ for pixel $X_j$ of the black correction data is expressed by the following equation.

$$K_j=K1_j+(y_i(x)-y_{min})$$

Next, image processor 204 determines, in step S215, whether or not pixel $X_j$ is the final pixel in sector $S_i$. If pixel $X_j$ is not the final pixel, image processor 204 increments, in step S216, the pixel number j, and performs the process of step S214 again.

On the other hand, in step S217, if pixel $X_j$ is the final pixel, image processor 204 determines whether or not the sector number i is smaller than 2. If the sector number i is smaller than 2, image processor 204 increments, in step S218, the sector number i, and performs the process of step S214 again. That is, unless sector $S_i$ in which the black correction data have been calculated is the final sector (that is, sector $S_2$), image processor 204 changes sector $S_i$ to the next sector $S_{i+1}$ and repeats the calculation of the black correction data.

On the other hand, if the sector number i is not less than 2, practically, if the sector number is 2, image processor 204 finishes the rear stage of generating the correction data.

As described above, image processor 204 calculates the correction value $K_j$ of the black shading correction data by adding the value obtained by subtracting the minimum difference value $y_{min}$ from the difference value $y_i(x)$ of each sector to the output level $K1_j$ of the first black data.

[2-4. Reading Process]

When the black correction data and the white correction data have been calculated, image processor 204 performs a reading process. Specifically, image processor 204 causes, through reading controller 201, sensor module 102 to move and perform the reading process of the image of document S. Image processor 204 performs the shading correction on the read image, by using the black correction data and the white correction data.

More specifically, because the first black data acquired in step S105 have a very small output level, the interference noise included in the first black data is also very small (see point A in FIG. 10). On the other hand, the second black data are on the side where the density level is light compared to the first black data, and the output level is large. Therefore, an interference noise appears on the second black data (see point C in FIG. 10). By correcting the first black data by using the second black data, it is possible to generate the black correction data containing the interference noise.

The second black data are acquired while light source 205 is on, but the second black data are the image signal of black area 31 of reference sheet 3. Therefore, the part, of the output of the second black data, caused by the reflected light from black area 31 is very small, and the most part of the output is interference noise. Further, the density of black area 31 illuminated with light is extremely close to black, and therefore, the output caused by the reflected light from black area 31 is a little larger than the output of the first black data but is almost the same. Accordingly, the difference value $(K2_j-K1_j)$ between the output level of the second black data and the output level of the first black data can be regarded as approximately the interference noise. In the present disclosure, the difference value $(K2_j-K1_j)$ is linear-regressed, and the offset of the difference value $(K2_j-K1_j)$ in each sector is corrected, however, in principle, the black correction data containing the interference noise are generated by adding the difference value $(K2_j-K1_j)$ to the first black data. That is, the data at point A' in FIG. 10 are generated.

By performing the shading correction using the black correction data (point A' in FIG. 10) containing the interference noise and the white correction data (point B in FIG. 10) initially containing the interference noise, it is possible to perform the shading correction based on the actual output, of sensor 207, including the interference noise. As a result, as shown in FIG. 9C, the density unevenness at the part, of the read image, corresponding to the boundary of sectors of sensors 207 is reduced, whereby the read image close to the image of document S in FIG. 9A can be obtained.

Note that, when image processor 204 serially reads images of a plurality of documents S, the second black data are acquired once by using reference sheet 3 before starting to read a series of documents S, and the first black data and the white data are acquired before every reading at the time of image reading of documents S. Then, the shading correction of the image data of each document S is performed by generation of the black correction data and the white correction data based on the second black data acquired once before reading all documents S and the first black data and the white data acquired every time before every reading.

3. Conclusion

As described above, image reading device 10 of the present disclosure includes: FB glass 12 and ADF glass 13 on which an object is placed; sensor module 102 that includes light source 205 to illuminate the object on FB glass 12 and ADF glass 13 and includes a plurality of sensors 207 to read light reflected from the object to acquire image signals; image processor 204 that generates correction data to be used for shading correction; and image processor 204 that performs the shading correction on the image signals acquired by the plurality of sensors 207 by using the correction data. The plurality of sensors 207 is arranged in a predetermined main scanning direction, and the image signals of the sensors constitute a single line, extending in the main scanning direction, of the image signals. Image processor 204 acquires second black data by causing the plurality of sensors 207 to acquire image signals of reference sheet 3 placed on FB glass 12 or ADF glass 13 and illuminated by light source 205. Image processor 204 generates black correction data as a black reference for the shading correction based on the second black data, and performs the shading correction by using the black correction data, so that density unevenness, in an image, caused by interference between the image signals from the plurality of sensors 207 is corrected.

With this configuration, the second black data are acquired by acquiring the image signal of reference sheet 3 while light source 205 is on, and therefore, the second black data contain an interference noise to a certain extent. The black correction data are generated based on the second black data, so that the black correction data containing an interference noise are generated. By performing the shading correction using the thus generated black correction data, the density unevenness, in the image, caused by the interference noise is corrected.

In addition to that, image reading device 10 has reference sheet 3 placed on FB glass 12 and acquires the second black data from the image signal of black area 31 of reference sheet 3. Therefore, it is not necessary to separately provide a member such as a black reference plate on image reading device 10 for acquiring the second black data, and the configuration of image reading device 10 can thus be simple.

Further, image processor 204 acquires the second black data using, as the black reference, member reference sheet 3 having black area 31.

With this configuration, because reference sheet 3 is made of paper, it is possible to acquire the second black data by using the same material as that of document S from which image reading device 10 actually acquires an image. Thus, more appropriate black correction data can be generated.

Further, image processor 204 acquires the first black data based on the output of the plurality of sensors 207 while light source 205 is off, and generates the black correction data based on the first black data and the second black data.

With this configuration, the first black data are the data of black at a density level darker than the second black data. However, because the density level of the first black data is dark, the output level itself is low and the contained interference noise is small. That is, although the first black data are the data of black at a dark density level, the interference noise does not appear appropriately. On the other hand, although the density level of the second black data is lighter than that of the first black data, the second black data contain an interference noise to a certain extent. Therefore, by generating the black correction data based on the first black data and the second black data (for example, the first black data are corrected by the second black data), it is possible to generate the black correction data that are at a dark density level and contain an interference noise.

Further, image reading device 10 further includes white reference plate 14 having a white area, and image processor 204 acquires white data by causing the plurality of sensors 207 to acquire an image signal of white reference plate 14 illuminated by light source 205, generates white correction data as a white reference for the shading correction based on the white data, and performs the shading correction by using the black correction data and the white correction data.

With this configuration, the white data contain the interference noise, and the white correction data also contain the interference noise. Thus, the shading correction is performed with the black correction data containing the interference noise and the white correction data containing the interference noise, and therefore, it is possible to appropriately perform the shading correction based on an actual output of sensors 207.

Still further, when image processor 204 serially reads images of a plurality of documents S, the second black data are acquired at least once before starting to read a series of documents S, and in addition, the first black data and the white data are acquired before every reading at the time of image reading of documents S.

That is, in order to acquire the second black data, reference sheet 3 needs to be placed on FB glass 12 or ADF glass 13. In order to acquire the second black data at every reading of each document S during serial reading of the images of documents S, reference sheet 3 needs to be placed on FB glass 12 or ADF glass 13 every time the reading of one document S is finished, whereby the series of readings of the images of documents S take a long time. For this reason, the second black data are acquired at least once before the series of readings of the images of documents S, and are not acquired at every reading of the image of each document S. This operation can shorten a time required for the series of readings of the images of documents S. On the other hand, the first black data and the white data can be acquired without placing reference sheet 3 on FB glass 12 or ADF glass 13, and are therefore acquired at every reading of the image of each document S. By this operation, it is possible to also correct temporal change of shading such as temperature characteristics. Note that although the second black data are not acquired at every reading of the image of each document S, the method for acquiring the second black data is not limited to the method in which the second black data are acquired only once before a series of readings of the images of documents S are started. That is, in case where it becomes necessary for the second black data to be acquired again during the series of readings of documents S or in other cases, it is also possible to interrupt the series of readings of documents S to acquire the second black data with reference sheet 3 placed on FB glass 12 or ADF glass 13.

Other Exemplary Embodiments

The first exemplary embodiment has been described above as an example of the techniques disclosed in the present disclosure. However, the techniques of the present disclosure are not limited to the above exemplary embodiment, and are applicable to exemplary embodiments in which modification, replacement, addition, or removal is appropriately made. Further, it is possible to combine the components described in the above exemplary embodiment to provide a new exemplary embodiment. Further, the components described in the accompanying drawings and in the detailed description include not only components necessary for solving the problems, but also components unnecessary for solving the problems to exemplify the above techniques. For this reason, it should not be immediately recognized that, only because components are described in the accompanying drawings and in the detailed description, all these components are necessary.

Note that, the first exemplary embodiment may be configured as described below.

For example, in the first exemplary embodiment, the plurality of sensors 207 is divided into three sectors. However, there is no limitation in the division number of sectors.

Further, although plate-shaped white reference plate 14 is used to acquire the white data, the configuration is not limited thereto. For example, in the same manner as the black reference member, a reference sheet may be employed as a white reference member. Specifically, a reference sheet having a white area may be prepared, separately from reference sheet 3 having black area 31. Alternatively, reference sheet 3 may be provided with a white area along with black area 31. That is, as long as the white data can be acquired, various configurations may be employed.

Further, although reference sheet 3 is placed on FB glass 12, the arrangement is not limited thereto. Reference sheet 3 may be fed by ADF 16 so as to pass on ADF glass 13, and the second black data may be acquired by causing sensor 207 to read reference sheet 3 passing on ADF glass 13. That is, in the present disclosure, the expression "placed on the glass plate" includes a case where the black reference member such as reference sheet 3 passes on the glass plate, in other words, a case where the black reference member is instantaneously placed on the glass plate.

Further, scanner unit 11 is connected to controller 100 through FFC 15, but the arrangement is not limited thereto. Any communication cable can be used as the wires for connecting between scanner unit 11 and controller 100. For example, scanner unit 11 and controller 100 may be connected by flexible printed circuits (FPC) or the like.

Further, the order of performing the steps of the flowcharts in the first exemplary embodiment may be changed as long as a desired objective is achieved, and further, some steps can be performed parallely. For example, it is possible to change the order of the acquisition of the second black data, the calibration, the acquisition of the first black data, the acquisition of the white data, and the like. Further, in the above description, after the data are acquired (step S1), the correction data are generated (step S2). However, the correction data may be generated (step S2) while the data are being acquired and just after the first black data and the second black data are completely acquired (for example, before the white data start to be acquired).

Further, although the first black data and the white data are acquired before the reading of the image of document S every time the image is read, the arrangement is not limited thereto. The first black data and the white data may be acquired after the reading of the image of document S every time the image is read. Further, the first black data and the white data may be acquired not every time the image of document S is read, but once before the series of readings of the images of documents S are started.

Further, image processor 204 functions as the data generator and the corrector, but the configuration is not limited thereto. The data generator and the corrector may be different components. Further, the data generator and the corrector do not have to be image processor 204, and another processor different from image processor 204 may function as the data generator or the corrector.

As described above, the techniques disclosed herein are useful for image reading devices.

What is claimed is:

1. An image reading device that reads an image of an object, the image reading device comprising:
    a glass plate on which the object is placed;
    a sensor module, the sensor module including:
        a light source that illuminates the object on the glass plate; and
        a plurality of sensors that reads light reflected from the object to acquire image signals;
    a data generator that generates correction data to be used for shading correction;
    a corrector that performs, by using the correction data, the shading correction on the image signals acquired by the plurality of sensors; and
    a white reference plate having a white area,
    wherein the plurality of sensors is arranged in a predetermined main scanning direction and is configured such that outputs of the plurality of sensors constitute a single line, extending in the main scanning direction, of the image signals,
    the data generator acquires first black data based on outputs of the plurality of sensors with the light source turned off, acquires second black data by causing the plurality of sensors to acquire an image signal of a black reference member placed on the glass plate when the light source is illuminating the black reference member, and generates black correction data as a black reference for the shading correction based on the first black data and the second black data,
    the data generator acquires white data by causing the plurality of sensors to acquire an image signal of the white reference plate illuminated by the light source, and generates white correction data as a white reference for the shading correction based on the white data,
    the corrector performs the shading correction by using the black correction data and the white correction data, and
    when images of a plurality of the object are sequentially read, the data generator acquires the second black data at least once before start of a series of readings of the images of the plurality of the object, and acquires the first black data and the white data at every reading of each of the images of the plurality of the object.

2. The image reading device according to claim 1, wherein the data generator acquires the second black data by using, as the black reference member, a reference sheet having a black area.

* * * * *